(12) United States Patent
Swarbrick et al.

(10) Patent No.: US 10,243,882 B1
(45) Date of Patent: Mar. 26, 2019

(54) NETWORK ON CHIP SWITCH INTERCONNECT

(71) Applicant: Xilinx, Inc., San Jose, CA (US)

(72) Inventors: Ian A. Swarbrick, Santa Clara, CA (US); Sagheer Ahmad, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 27 days.

(21) Appl. No.: 15/486,969

(22) Filed: Apr. 13, 2017

(51) Int. Cl.
*H03K 19/177* (2006.01)
*H04L 12/933* (2013.01)
*H04L 12/741* (2013.01)

(52) U.S. Cl.
CPC ............ *H04L 49/109* (2013.01); *H04L 45/74* (2013.01)

(58) Field of Classification Search
CPC .............................. H04L 49/109; H04L 45/74
See application file for complete search history.

(56) References Cited

U.S. PATENT DOCUMENTS

| | | | |
|---|---|---|---|
| 6,430,188 B1 * | 8/2002 | Kadambi | ................ H04L 12/46 370/390 |
| 7,185,309 B1 | 2/2007 | Kulkarni et al. | |
| 7,281,093 B1 | 10/2007 | Kulkarni et al. | |
| 7,454,658 B1 | 1/2008 | Baxter | |
| 7,380,035 B1 | 5/2008 | Donlin | |
| 7,500,060 B1 | 3/2009 | Anderson et al. | |
| 7,521,961 B1 | 4/2009 | Anderson | |
| 7,574,680 B1 | 8/2009 | Kulkarni et al. | |
| 7,650,248 B1 | 1/2010 | Baxter | |
| 7,788,625 B1 | 8/2010 | Donlin et al. | |
| 7,831,801 B1 | 11/2010 | Anderson | |
| 8,006,021 B1 | 8/2011 | Li et al. | |
| 8,020,163 B2 | 9/2011 | Nollet et al. | |
| 8,214,694 B1 | 7/2012 | McKechnie et al. | |
| 2002/0093973 A1 * | 7/2002 | Tzeng | ................. H04L 12/5601 370/419 |

(Continued)

FOREIGN PATENT DOCUMENTS

WO   WO 2016099779   *  6/2016  ........... H04L 12/771

OTHER PUBLICATIONS

ARM Limited, "AMBA 3 APB Protocol Specification," v1.0, Sep. 25, 2003, pp. 1-34, ARM Limited, Cambridge, United Kingdom.

(Continued)

*Primary Examiner* — Jay P Patel
(74) *Attorney, Agent, or Firm* — LeRoy D. Maunu

(57) ABSTRACT

A disclosed network on chip includes a semiconductor die and switches disposed on the semiconductor die. Each switch has ports configured to receive packets from and transmit packets to at least two other switches. Each switch includes first circuitry that specifies a first mapping of interface identifiers of interfaces on the semiconductor die to port identifiers, and second circuitry that specifies a second mapping of region identifiers of regions of the semiconductor die to port identifiers. Each switch further includes third circuitry coupled to the first and second circuitry. The third circuitry is configured to select, in response to an input packet that specifies a destination region and a destination interface, a port based on the specification of the destination region, specification of the destination interface, first mapping, and second mapping, and output the packet on the selected port.

16 Claims, 4 Drawing Sheets

(56) References Cited

U.S. PATENT DOCUMENTS

| | | |
|---|---|---|
| 2004/0114609 A1 | 6/2004 | Swarbrick et al. |
| 2004/0210695 A1 | 10/2004 | Weber et al. |
| 2006/0095920 A1* | 5/2006 | Goossens ............... H04L 47/10 |
| | | 719/313 |
| 2008/0320255 A1 | 12/2008 | Wingard et al. |
| 2008/0320268 A1 | 12/2008 | Wingard et al. |
| 2012/0036296 A1 | 2/2012 | Wingard et al. |
| 2017/0140800 A1 | 5/2017 | Wingard et al. |

OTHER PUBLICATIONS

ARM Limited, "AMBA 4 Axis-Stream Protocol Specification," v1.0,Mar. 3, 2010, pp. 1-42, ARM Limited, Cambridge, United Kingdom.

ARM Limited, "AMBA AXI and ACE Protocol Specification," Jun. 16, 2003, pp. 1-306, ARM Limited, Cambridge, United Kingdom.

Dally, William J. et al., "Deadlock=Free Message Routing in Multiprocessor Interconnection Networks," IEEE Transactions on Computers, May 1987, pp. 547-553, vol. C-36, No. 5, IEEE, Piscataway, New Jersey, USA.

Glass, Christopher et al., "The Turn Model for Adaptive Routing," Journal of the Association for Computing Machinery, Sep. 1994, pp. 874-902, vol. 41, No. 5, ACM, New York, New York, USA.

Rantala, Ville et al., "Network on Chip Routing Algorithms," TUCS Techncal Report No. 779, Aug. 2006, pp. 1-38, Turku Centre for Computer Science, Turku, Finland.

* cited by examiner

NETWORK ON CHIP SWITCH INTERCONNECT

TECHNICAL FIELD

The disclosure generally relates to switches for a network on chip (NOC).

BACKGROUND

Bus structures have been found to be unsuitable for some system on chip (SOC) applications (SOCs). With increases in circuit integration, transactions can become blocked and increased capacitance can create signaling problems. In place of a bus structure, a network on chip (NOC) is sometimes used to support data communications between components on the chip.

An NOC generally includes a collection of switches that route packets from source circuits ("sources") on the chip to destination circuits ("destinations") on the chip. The layout of the switches in the chip supports packet transmission from the desired sources to the desired destinations. A packet may traverse multiple switches in transmission from a source to a destination. Each switch can be connected to one or more other switches in the network and routes an input packet to one of the connected switches or to the destination.

The switches of some NOCs employ routing tables to determine on which output port an input packet should be routed. The routing tables can be either fixed or programmable, and at each switch, the switch looks-up the output port based on the destination. Other approaches may use source-based routing in which the packet includes routing information for the switches.

SUMMARY

A disclosed network on chip includes a semiconductor die and a plurality of switches disposed on the semiconductor die. Each switch is coupled to receive packets from, and transmit packets to at least two other switches of the plurality of switches. Each switch has a plurality of ports configured to receive and transmit the packets. Each switch includes first circuitry that specifies a first mapping of interface identifiers of interfaces on the semiconductor die to port identifiers of the plurality of ports, and second circuitry that specifies a second mapping of region identifiers of regions of the semiconductor die to port identifiers of the plurality of ports. Each switch further includes third circuitry coupled to the first and second circuitry. The third circuitry is configured to select, in response to an input packet that specifies a destination region and a destination interface, one port of the plurality of ports based on the specification of the destination region, specification of the destination interface, first mapping, and second mapping, and output the packet on the one port.

A disclosed switch includes a plurality of ports. Each port is configured to receive and transmit packets. The switch further includes first circuitry that specifies a first mapping of interface identifiers to port identifiers of the plurality of ports, and second circuitry that specifies a second mapping of region identifiers of regions of a semiconductor die to port identifiers of the plurality of ports. Third circuitry of the switch is coupled to the first and second circuitry. The third circuitry is configured to select, in response to an input packet that specifies a destination region and a destination interface, one port of the plurality of ports based on the specification of the destination region, specification of the destination interface, first mapping, and second mapping, and output the packet on the one port.

A disclosed integrated circuit arrangement includes a plurality of semiconductor dies, a plurality of source circuits disposed on the plurality of semiconductor dies, and a plurality of destination circuits disposed on the plurality of semiconductor dies. The integrated circuit arrangement further includes a plurality of switches disposed on the plurality of semiconductor dies. Each switch is coupled to receive packets from and transmit packets to at least two other switches of the plurality of switches, and each switch has a plurality of ports configured to receive and transmit the packets. Each source circuit is coupled to a port of one of the plurality of switches, and each destination circuit is coupled to a port of one of the plurality of switches. Each switch includes first circuitry that specifies a first mapping of interface identifiers of interfaces on the semiconductor die to port identifiers of the plurality of ports, and second circuitry that specifies a second mapping of region identifiers of regions of the semiconductor dies to port identifiers of the plurality of ports. Each switch further includes third circuitry coupled to the first and second circuitry. The third circuitry is configured to select, in response to an input packet that specifies a destination region and a destination interface, one port of the plurality of ports based on the specification of the destination region, specification of the destination interface, first mapping, and second mapping, and output the packet on the one port.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which.

DETAILED DESCRIPTION

Figure 1:
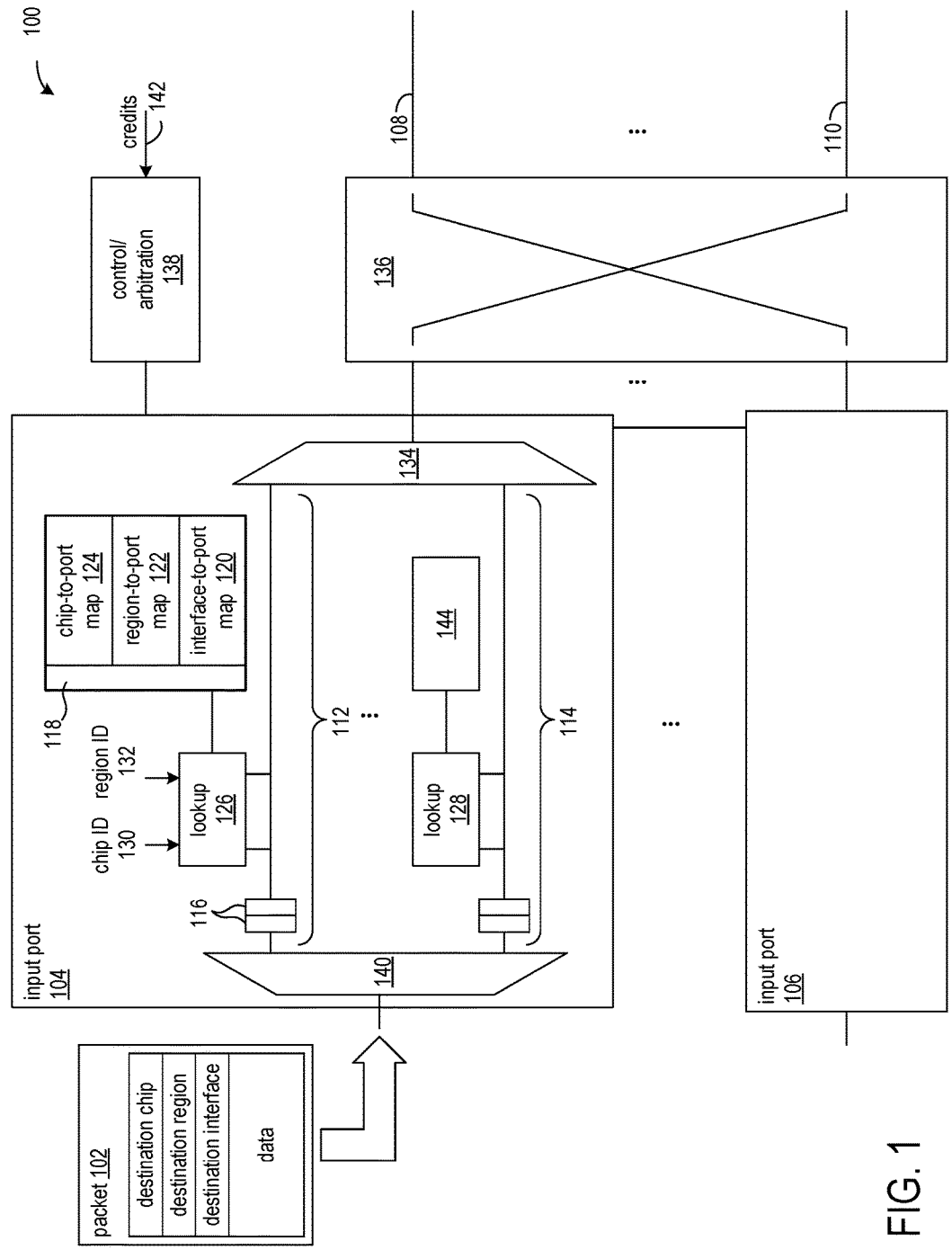
FIG. 1 shows an exemplary switch arrangement that routes input packets using hierarchical destination addresses and hierarchical routing tables.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Routing tables can be problematic for some NOCs. Some NOCs can have thousands of destinations, and each routing table in each switch of the NOC may have an entry for each of the possible destinations. For example, if each switch has four output ports and the NOC supports 4000 possible destinations, two bits would be needed to encode the four output port identifiers, and the routing table would have 4000, 2-bit entries. To support the large number of destinations, a large number of switches would be needed, and each switch can have one or more routing tables. Such a large routing table would occupy a significant area on the chip and delay lookup. The challenges associated with the size of the routing tables are compounded in applications in which an NOC spans multiple chips in a package.

The disclosed circuitry employs hierarchical routing tables in the switches of an NOC and reduces area and power requirements as compared to prior NOC routing tables. The approaches have been found to be especially beneficial in multi-chip applications in which each chip (semiconductor die) has an NOC that is connected to the NOC(s) of one or more other chips. Each of the chips has multiple source circuits and multiple destination circuits. The source circuits are configured to communicate with the destination circuits by way of packets transmitted on the NOCs. A source circuit sends packets, and a destination circuit receives packets. The NOCs include multiple switches on the semiconductor dies. Each switch has multiple input and output ports and is coupled to receive input packets from other switches and/or directly from a source circuit.

Each switch is configured to route input packets received at the input ports to the output ports of the switch based on hierarchical destination addresses in the input packets and the content of hierarchical routing tables of the switch. Each hierarchical destination address specifies a chip identifier, a region identifier, and an interface identifier. The chip identifier specifies the semiconductor die on which the destination circuit is disposed, the region identifier specifies an area of the semiconductor die in which the destination circuit is disposed, and the interface identifier specifies the particular destination circuit. The circuitry that implements the routing tables specifies a mapping of interface identifiers to port identifiers of the ports of the switch, a mapping of region identifiers to port identifiers of the ports of the switch, and a mapping of chip identifiers to port identifiers of the ports of the switch.

Routing circuitry on each switch selects, in response to the destination address in an input packet, one of the output ports based on the mappings in the routing tables, and outputs the packet on the selected port. The output packet from the port of one switch is the input packet and the input port of another switch or an input packet to the destination circuit.

FIG. 1 shows an exemplary switch arrangement 100 that routes input packets 102 using hierarchical destination addresses and hierarchical routing tables. The switch arrangement includes multiple input ports shown as ports 104 through 106 and multiple output ports shown as ports 108 through 110. Each input port is coupled to receive input packets, and each output port is coupled to another switch (not shown) or to a destination circuit (not shown). An input packet includes, among other data, a destination address, which specifies a destination chip, a destination region, and a destination interface.

Each input port includes multiple virtual channels. For example, input port 104 is shown as having virtual channels 112 through 114. Each virtual channel includes buffer circuitry and routing circuitry. The buffer circuitry is shown as blocks 116 in virtual channel 112. The buffer circuitry can be implemented as a first-in-first-out buffer circuit, for example. Each virtual channel further includes a respective routing table 118, which includes mapping circuitry 120, 122, and 124. Mapping circuitry 120 implements an interface-to-port map, mapping circuitry 122 implements a region-to-port map, and mapping circuitry 124 implements a chip-to-port map.

The interface-to-port map 120 maps interface identifiers to port identifiers. Each interface identifier identifies one of the destination circuits, and each port identifier identifies one of the output ports of the switch. The region-to-port map 122 maps region identifiers to port identifiers, and each region identifier identifies a particular region of a semiconductor die having destination circuits. The chip-to-port map 124 maps chip identifiers to port identifiers, and each chip identifier identifies one of the semiconductor dies in a multi-die implementation.

A respective lookup circuit is coupled to each virtual channel to receive the destination address in each input packet. In one implementation, the lookup circuit and the mapping circuitry 120, 122, and 124 is replicated on each virtual channel. For example, lookup circuit 126 receives the destination address of an input packet on virtual channel 112, and lookup circuit 128 receives the destination address of an input packet on virtual channel 114. Lookup circuit 128 is coupled to routing table 144, which replicates the mapping circuitry 120, 122, and 124.

Each input port of a switch is paired with an output port of the switch. That is, if an input port of a switch is connected to another switch, the output port of the pair is connected to the same switch. For example, input port 104 is paired with output port 108, and input port 106 is paired with output port 110. In response to an input packet, the lookup circuit of a virtual channel in an input port selects one of the output ports of the switch, other than the output port with which the input port is paired, for outputting the packet. For example, if lookup circuit 126 receives the destination address of an input packet, the lookup circuit selects an output port other than output port 108 for outputting the packet.

The lookup circuit 126 selects an output port based on the destination address in the input packet, the semiconductor die on which the switch is disposed, the region of the semiconductor die in which the switch is disposed, the chip-to-port map 124, the region-to-port map 122, and the interface-to-port map 120. Each lookup circuit is further coupled to memory circuits (not shown) that store the chip identifier 130 that identifies the semiconductor die on which the switch is disposed and the region identifier 132 of the region of the semiconductor die in which the switch is disposed. The memories that store the chip identifier and region identifier can be shared by multiple switches on a chip.

In selecting an output port, the lookup circuit 126 compares the specification of the destination chip in the input packet 102 to the chip identifier 130. If the values do not match, the routing circuit looks up the port identifier in the chip-to-port map 124 using the specification of the destination chip from the input packet. The lookup circuit appends the port identifier to the input packet, which is input to the multiplexer 134. Multiplexer 134 selects a packet from one of the virtual channels 112 through 114 for input to the switch circuit 136. Once the switching is complete and the packet reaches the output port, the port ID is no longer needed and is discarded from the packet.

If the specification of the destination chip in the input packet 102 matches the chip identifier 130, the lookup circuit compares the specification of the destination region in the input packet to the region identifier 132. If the values do not match, the lookup circuit looks up the port identifier in the region-to-port map 122 using the specification of the destination region from the input packet. The lookup circuit adds the port identifier to the input packet, which is input to the multiplexer 134.

If the destination region specified in the input packet 102 matches the region identifier 132, the lookup circuit looks up the port identifier in the interface-to-port map 120 using the specification of the destination interface from the input packet. The lookup circuit adds the port identifier to the input packet, which is input to the multiplexer 134. In one implementation, if the port mapped to the destination interface is the same as the input port on which the packet is received, an interrupt signal (not shown) is generated to indicate an error. Disallowing certain routes through the network provides a measure of security.

The mapping circuitry 120, 122, and 124 can be implemented as memories that are addressed by selected bits of the destination address from the input packet 102. The width of the memories depends on the number of output ports in each switch. For example, for a switch having 4 output ports, the memories would need 2 bits to identify the 4 output ports. The interface-to-port memory 120 can be addressed by the destination interface bits of the destination address, the region-to-port memory 122 can be addressed by the destination region of the destination address, and the chip-to-port memory 124 can be addressed by the destination chip of the destination address.

Each input port has an input de-multiplexer and an output multiplexer. The input de-multiplexer selects one of the virtual channels to buffer the input packet in response to control signals from the control/arbitration circuit 138. The multiplexer selects an input packet from one of the virtual channels for input to the switch circuit 136 in response to control signals from the control/arbitration circuit. For example, in input port 104, input de-multiplexer 140 selects one of the virtual channels 112 through 114 to buffer the input packet, and output multiplexer 134 selects an input packet from one of the virtual channels 112 through 114. The control/arbitration circuit generally tracks the fill levels of the buffers 116 in each of the virtual channels and the flow control credits 142 as signaled from the next switch, which indicate availability of buffer space in the virtual channels in the connected switches. The control/arbitration circuit selects one of the virtual channels 112 through 114 for receiving an input packet and selecting one of the virtual channels 112 through 114 to provide an input packet to the switch circuit 136.

Figure 2:
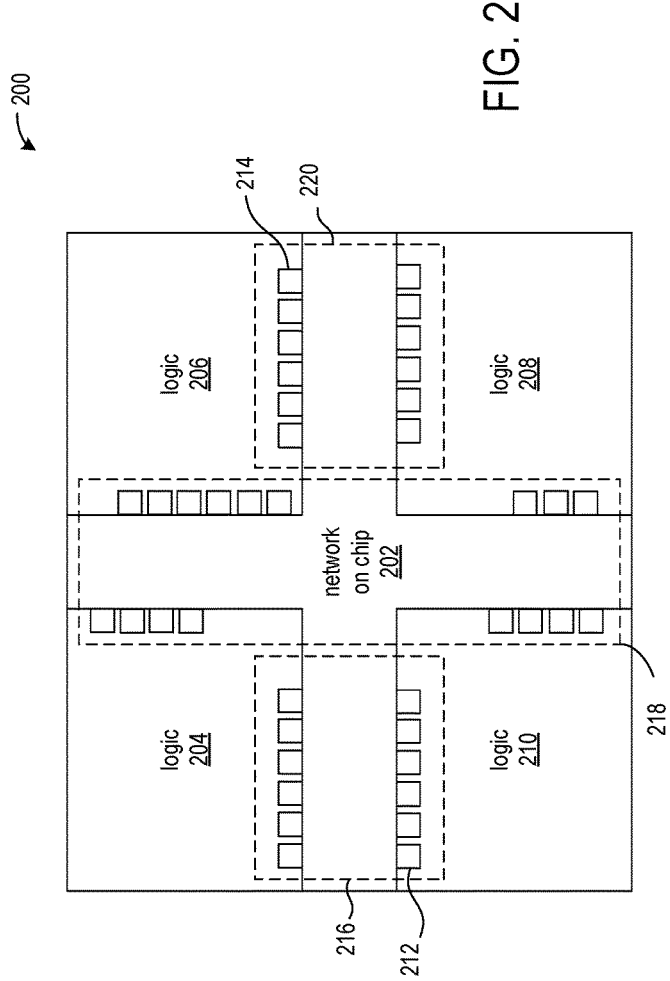
FIG. 2 shows a semiconductor die in which the switches (not shown) of an NOC employ hierarchical routing of packets.

FIG. 2 shows a semiconductor die 200 in which the switches (not shown) of an NOC 202 employ hierarchical routing of packets. The semiconductor die illustrates the relationship of the chip, region, and interface portions of a destination address to physical parts of a semiconductor die.

The semiconductor die 200 includes logic circuits 204, 206, 208, and 210. Each of the logic circuits is connected to the NOC 202 by multiple interface circuits, which are illustrated as small blocks such as blocks 212 and 214. Each of the interface circuits can be either a source of a packet and/or a destination of a packet.

The hierarchical routing scheme divides the semiconductor die into regions, and each region has a group of switches and interface circuits disposed therein. The exemplary die 200 has regions 216, 218, and 220. Region 216 has a subset of the interface circuits to logic circuits 204 and 210, region 218 has a subset of the interface circuits to logic circuits 204, 206, 208, and 210, and region 220 has a subset of the interface circuits to logic circuits 206 and 208. Each region can have one or more registers (not shown) that can be programmed with a region identifier that is unique for the regions on the die. Each region identifier is input to the switches that are disposed in the identified region.

Figure 3:
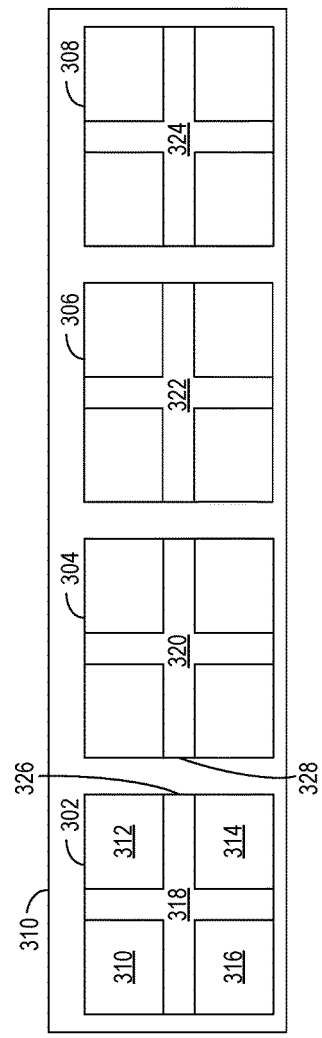
FIG. 3 shows a multi-chip device having NOCs that employ hierarchical routing of packets by the switches.

FIG. 3 shows a multi-chip device having NOCs that employ hierarchical routing of packets by the switches. The multi-chip device includes exemplary semiconductor dies 302, 304, 306, and 308 that are mounted on a silicon interposer 310.

Each die has an NOC and logic circuits that are connected by the NOC. For example, die 302 has logic circuits 310, 312, 314, and 316 that are connected by NOC 318. Similarly, dies 304, 306, and 308 have respective sets of logic circuits and NOCs 320, 322, and 324. Each of the dies 302, 304, 306, and 308 has a unique chip identifier, which can be programmed into one or more registers that are shared by the switches on the die. The dies can have interface circuits and multiple regions such as those shown in FIG. 2. Each switch in each NOC routes an input packet to an output port of the switch as described above. Though the dies are shown as having the same general layout, it will be appreciated that different applications may call for different numbers of logic circuits and different NOC layouts on the dies.

Signal lines (not shown) in the interposer 310 connect the switches in the NOCs. For example, the switches at the edge 326 of NOC 318 are connected through the interposer to the switches at the edge 328 of NOC 320. NOC 320 can be similarly connected to NOC 322, and NOC 322 can be similarly connected to NOCs 320 and 324.

Figure 4:
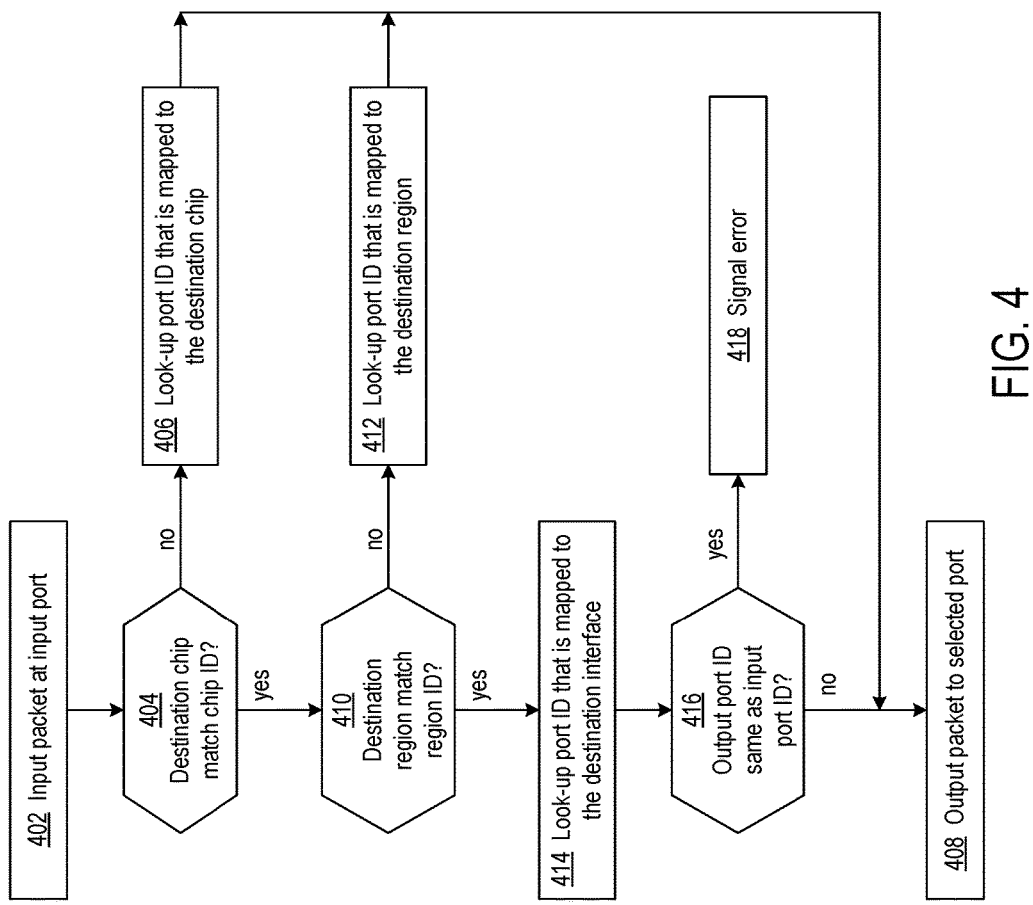
FIG. 4 shows a flowchart of a process for routing an NOC packet by a switch using hierarchical addressing.

FIG. 4 shows a flowchart of a process for routing an NOC packet by a switch using hierarchical addressing. At block 402, the switch inputs a packet at one of the input ports of the switch. The switch at decision block 404 compares the specification of the destination chip in the input packet to the chip identifier of the semiconductor die on which the switch is disposed. If the specification of the destination chip does not match the chip identifier, which indicates the destination is on another semiconductor die, at block 406 the switch looks up the port identifier that is mapped to the specification of the destination chip in the chip-to-port map of the routing table. At block 408, the switch outputs the packet on the port determined at block 406.

If the switch determines at block 404 that the specification of the destination chip matches the chip identifier, which indicates the destination is on the same semiconductor die as the switch, at decision block 410 the switch compares the specification of the destination region in the input packet to the region identifier of the region in which the switch is disposed. If the specification of the destination region does not match the region identifier, which indicates that the destination is in another region of the die, at block 412 the switch looks up the port identifier that is mapped to the specification of the destination region in the region-to-port map of the routing table. At block 408, the switch outputs the packet on the port determined at block 412.

If the switch determines at block 410 that the specification of the destination region matches the region identifier, which indicates the destination is in the same region as the switch, at block 414 the switch looks up the port identifier that is mapped to the specification of the destination interface in the interface-to-port map of the routing table. The switch at decision block 416 compares the port identifier (output port identifier) found at block 414 to the input port identifier. If the output port identifier is the same as the identifier of the input port on which the packet was received, at block 418 the switch signals an error.

Disallowing a packet to be output on the same port as the port on which the packet was input provides security against certain threats. For example if security measures call for denying a master interface from accessing a particular destination, for example, "destID 55," then the first switch a packet encounters from the master interface has destID 55 route back to the input port of the packet, which is detected as an error. The disclosed switch circuitry uses the fact that there are three output ports to which a packet can be routed in a switch, and two bits (four encodings) represent the output ports. The spare (fourth) encoding is used to flag an error condition. If the switch determines at block 416 that the output port identifier is not the same as the input port identifier, at block 408 the switch outputs the packet on the port determined at block 414.

Figure 5:
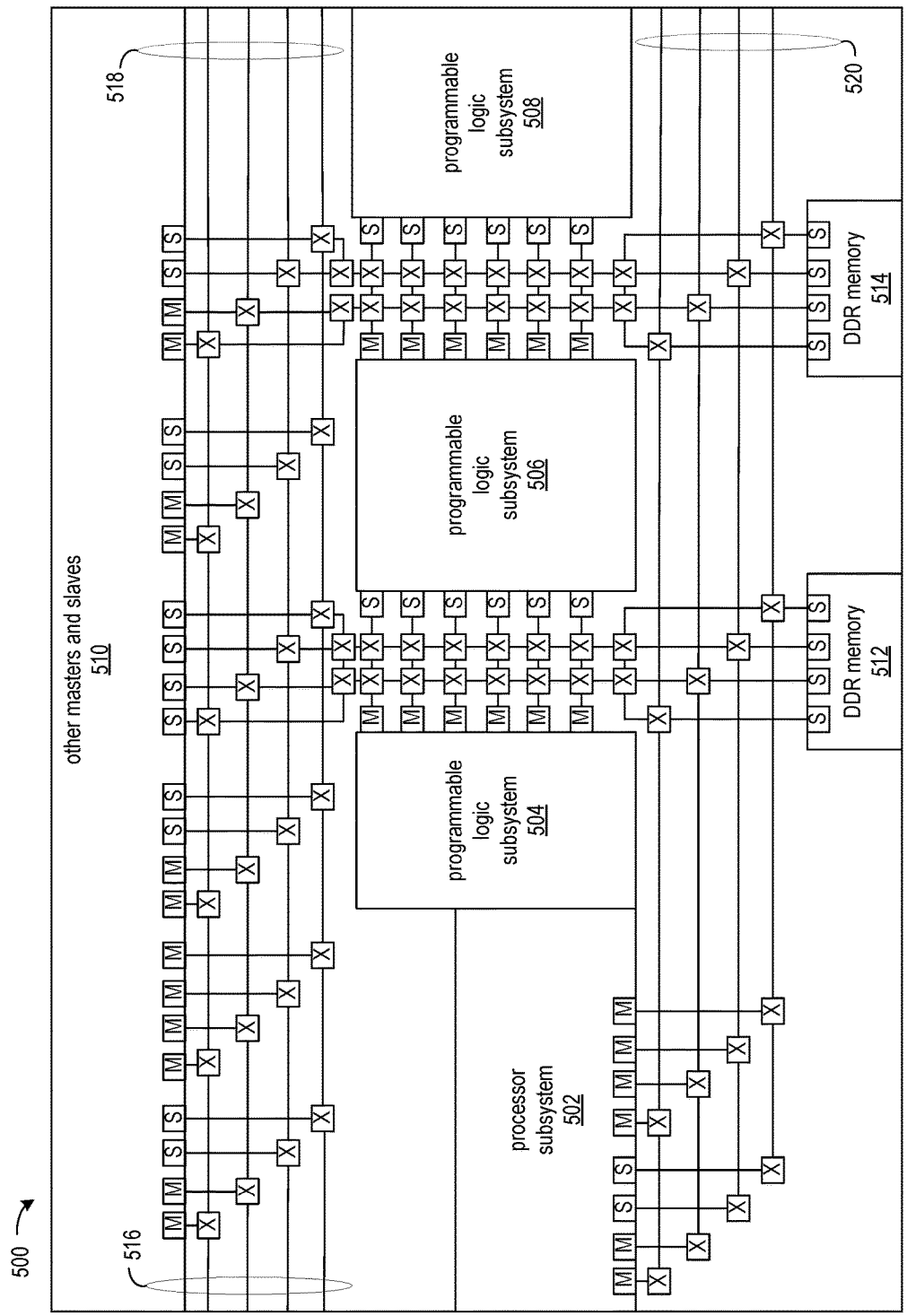
FIG. 5 shows an exemplary programmable integrated circuit (IC) on which the disclosed NOC and switches can be implemented.

FIG. 5 shows an exemplary programmable integrated circuit (IC) 500 on which the disclosed NOC and switches can be implemented. The programmable IC may also be referred to as a System On Chip (SOC) that includes field programmable gate array logic (FPGA) along with other programmable resources. FPGA logic may include several different types of programmable logic blocks in the array. For example, FIG. 5 illustrates programmable IC 500 that includes a processor subsystem 502 and a programmable logic subsystem shown as blocks 504, 506, and 508. The programmable IC further includes other masters and slaves 510 and DDR memory circuits 512 and 514. Though not shown, the programmable IC can also include multi-gigabit transceivers (MGTs), random access memory blocks (BRAMs), input/output blocks (IOBs), configuration and clocking logic (CONFIG/CLOCKS), specialized input/output blocks (I/O), digital clock managers, analog-to-digital converters, system monitoring logic, and so forth.

The processor subsystem 502, programmable logic subsystem 504, 506, and 508, other masters and slaves 510, and DDR memory circuits 512 and 514 are communicatively coupled via an NOC. The NOC includes multiple switches, which are illustrated as small blocks having "X"s. Each of the switches is connected to one or more other switches and interface circuit. Some switches are connected to one or more other switches and to an interface circuit. In the exemplary programmable IC, the interface circuits are master circuits and slave circuits, which are illustrated as small blocks labelled "M" and "S," respectively.

The programmable IC 500 can be implemented on a single semiconductor die, and the NOC connected to the NOC on another die via an interposer. For example, NOC signal lines 516, 518, and 520 can be connected to adjacent switches in the NOCs of other dies through bridge circuitry (not shown).

Note that FIG. 5 is intended to illustrate only an exemplary programmable IC architecture. The layout and number of switches, programmable logic blocks, other masters and slaves, DDR memory circuits and processor subsystem are purely exemplary.

Though aspects and features may in some cases be described in individual figures, it will be appreciated that features from one figure can be combined with features of another figure even though the combination is not explicitly shown or explicitly described as a combination.

The methods and circuits are thought to be applicable to a variety of NOCs. Other aspects and features will be apparent to those skilled in the art from consideration of the specification. It is intended that the specification and drawings be considered as examples only, with a true scope of the invention being indicated by the following claims.

What is claimed is:
1. A network on chip, comprising:
 a semiconductor die; and
 a plurality of switches disposed on the semiconductor die, wherein each switch is coupled to receive packets from, and transmit packets to at least two other switches of the plurality of switches, and each switch has a plurality of ports configured to receive the packets and transmit the packets;
 wherein each switch includes first circuitry that specifies a first mapping of interface identifiers of interfaces on the semiconductor die to port identifiers of the plurality of ports and second circuitry that specifies a second mapping of region identifiers of regions of the semiconductor die to port identifiers of the plurality of ports; and
 wherein each switch includes third circuitry coupled to the first and second circuitry, wherein the third circuitry is configured to, in response to input of a packet having specifications of a destination region and a destination interface:
  look-up a port identifier in the second mapping in response to the specification of the destination region not matching a region identifier associated with the switch;
  look-up a port identifier in the first mapping in response to the specification of the destination region matching the region identifier associated with the switch; and
  select one port of the plurality of ports in response to the port identifier from the second mapping or the first mapping, and output the packet on the one port.

2. The network on chip of claim 1, wherein:
 the packet specifies a destination chip;
 each switch further includes fourth circuitry that specifies a third mapping of chip identifiers to port identifiers of the plurality of ports; and
 the third circuitry is further coupled to the fourth circuitry and is further configured to:
  look-up a port identifier in the third mapping in response to the specification of the destination chip not matching a chip identifier associated with the switch;
  look-up a port identifier in the second mapping in response to the specification of the destination chip matching the chip identifier associated with the switch and the specification of the destination region not matching the region identifier associated with the switch; and
  select the one port in response to the port identifier from the third, second, or first mapping.

3. The network on chip of claim 2, wherein:
 the first circuitry includes at each port, a respective memory containing the first mapping of interface identifiers to the plurality of ports;
 the second circuitry includes at each port, a respective memory containing the second mapping of region identifiers of the semiconductor die to the plurality of ports;
 the fourth circuitry includes at each port, a respective memory containing the third mapping of the chip identifiers to the port identifiers; and
 the third circuitry includes at each port, respective selection circuitry configured to:
  receive the packets at the port, and
  select, in response to each of the packets, one port of the plurality of ports based on the respective memory containing the first mapping, the respective memory containing the second mapping, and the respective memory containing the third mapping.

4. The network on chip of claim 3, wherein:
a destination address in the packet specifies the destination chip, destination region, and destination interface; and
the respective selection circuitry is further configured to:
   address the respective memory containing the first mapping of interface identifiers to the plurality of ports with a first subset of bits of the destination address,
   address the respective memory containing the second mapping of region identifiers of the semiconductor die to the plurality of ports with a second subset of bits of the destination address and
   address the respective memory containing the third mapping of the chip identifiers to the port identifiers with a third subset of bits of the destination address.

5. The network on chip of claim 1, wherein:
each switch includes a plurality of input ports and a plurality of output ports;
each input port of the plurality of input ports has a same port identifier as a port identifier of one output port of the plurality of output ports; and
the third circuitry is further configured to generate an error signal in response to the port identifier of the port that is mapped to the interface identifier that matches the specification of the destination interface, matching the port identifier of the input port of the plurality of input ports on which the packet was received.

6. A switch, comprising:
a plurality of ports, wherein each port is configured to input and output packets;
first circuitry that specifies a first mapping of interface identifiers to port identifiers of the plurality of ports;
second circuitry that specifies a second mapping of region identifiers of regions of a semiconductor die to port identifiers of the plurality of ports; and
third circuitry coupled to the first and second circuitry, wherein the third circuitry is configured to, in response to input of a packet having specifications of a destination region and a destination interface:
   look-up a port identifier in the second mapping in response to the specification of the destination region not matching a region identifier associated with the switch;
   look-up a port identifier in the first mapping in response to the specification of the destination region matching the region identifier associated with the switch; and
   select one port of the plurality of ports in response to the port identifier from the second mapping or the first mapping, and output the packet on the one port.

7. The switch of claim 6, wherein:
the packet specifies a destination chip;
the switch further includes fourth circuitry that specifies a third mapping of chip identifiers to port identifiers of the plurality of ports; and
the third circuitry is further coupled to the fourth circuitry and is further configured to:
   look-up a port identifier in the third mapping in response to the specification of the destination chip not matching a chip identifier associated with the switch;
   look-up a port identifier in the second mapping in response to the specification of the destination chip matching the chip identifier associated with the switch and the specification of the destination region not matching the region identifier associated with the switch; and
   select the one port in response to the port identifier from the third, second, or first mapping.

8. The switch of claim 7, wherein:
the first circuitry includes at each port, a respective memory containing the first mapping of interface identifiers to the plurality of ports
the second circuitry includes at each port, a respective memory containing the second mapping of region identifiers of the semiconductor die to the plurality of ports;
the fourth circuitry includes at each port, a respective memory containing the third mapping of the chip identifiers to the port identifiers; and
the third circuitry includes at each port, respective selection circuitry configured to:
   receive the packets input at the port, and
   select, in response to each of the packets input at the port, one port of the plurality of ports based on the respective first mapping, the respective second mapping, and the respective memory containing the third mapping.

9. The switch of claim 8, wherein:
a destination address in the packet specifies the destination chip, destination region, and destination interface; and
the respective selection circuitry is further configured to:
   address the respective memory containing the first mapping of interface identifiers to the plurality of ports with a first subset of bits of the destination address,
   address the respective memory containing the second mapping of region identifiers of the semiconductor die to the plurality of ports with a second subset of bits of the destination address and
   address the respective memory containing the third mapping of the chip identifiers to the port identifiers with a third subset of bits of the destination address.

10. The switch of claim 6, wherein:
the switch includes a plurality of input ports and a plurality of output ports;
each input port of the plurality of input ports has a same port identifier as a port identifier of one output port of the plurality of output ports; and
the third circuitry is further configured to generate an error signal in response to the port identifier of the port that is mapped to the interface identifier that matches the specification of the destination interface, matching the port identifier of the input port of the plurality of input ports on which the packet was received.

11. An integrated circuit arrangement, comprising:
a plurality of semiconductor dies;
a plurality of source circuits disposed on the plurality of semiconductor dies;
a plurality of destination circuits disposed on the plurality of semiconductor dies;
a plurality of switches disposed on the plurality of semiconductor dies, wherein each switch is coupled to receive packets from and transmit packets to at least two other switches of the plurality of switches, and each switch has a plurality of ports configured to receive and transmit the packets;
wherein each source circuit is coupled to a port of one of the plurality of switches, and each destination circuit is coupled to a port of one of the plurality of switches;

wherein each switch includes first circuitry that specifies a first mapping of interface identifiers of interfaces on the semiconductor die to port identifiers of the plurality of ports and second circuitry that specifies a second mapping of region identifiers of regions of the semiconductor dies to port identifiers of the plurality of ports;

wherein each switch includes third circuitry coupled to the first and second circuitry, wherein the third circuitry is configured to, in response to input of a packet that specifies a destination region and a destination interface:

look-up a port identifier in the second mapping in response to the specification of the destination region not matching a region identifier associated with the switch;

look-up a port identifier in the first mapping in response to the specification of the destination region matching the region identifier associated with the switch; and select one port of the plurality of ports in response to the port identifier from the second mapping or the first mapping, and output the packet on the one port.

12. The integrated circuit arrangement of claim 11, wherein:

the packet specifies a destination chip;

each switch further includes fourth circuitry that specifies a third mapping of chip identifiers to the plurality of ports;

the third circuitry is further coupled to the fourth circuitry and is further configured to:

look-up a port identifier in the third mapping in response to the specification of the destination chip not matching a chip identifier associated with the switch;

look-up a port identifier in the second mapping in response to the specification of the destination chip matching the chip identifier associated with the switch and the specification of the destination region not matching the region identifier associated with the switch; and select the one port in response to the port identifier from the third, second, or first mapping.

13. The integrated circuit arrangement of claim 11, wherein:

the first circuitry includes at each port, a respective memory containing the first mapping of interface identifiers to the plurality of ports;

the second circuitry includes at each port, a respective memory containing the second mapping of region identifiers of the semiconductor die to the plurality of ports;

the fourth circuitry includes at each port, a respective memory containing the third mapping of the chip identifiers to the port identifiers; and the third circuitry includes at each port, respective selection circuitry configured to:

receive the packets at the port, and select, in response to each of the packets, one port of the plurality of ports based on the respective memory containing the first mapping, the respective memory containing the second mapping, and the respective memory containing the third mapping.

14. The integrated circuit arrangement of claim 11, wherein:

each switch includes a plurality of input ports and a plurality of output ports;

each input port of the plurality of input ports has a same port identifier as a port identifier of one output port of the plurality of output ports; and the third circuitry is further configured to generate an error signal in response to the port identifier of the port that is mapped to the interface identifier that matches the specification of the destination interface, matching the port identifier of the input port of the plurality of input ports on which the packet was received.

15. The network on chip of claim 11, wherein:

the first circuitry includes at each port, a respective memory containing the first mapping of interface identifiers to the plurality of ports;

the second circuitry includes at each port, a respective memory containing the second mapping of region identifiers of the semiconductor die to the plurality of ports;

the fourth circuitry includes at each port, a respective memory containing the third mapping of the chip identifiers to the port identifiers; and the third circuitry includes at each port, respective selection circuitry configured to:

receive the packets at the port, and select, in response to each of the packets, one port of the plurality of ports based on the respective memory containing the first mapping, the respective memory containing the second mapping, and the respective memory containing the third mapping.

16. The integrated circuit arrangement of claim 15, wherein:

a destination address in the packet specifies the destination chip, destination region, and destination interface; and the respective selection circuitry is further configured to:

address the respective memory containing the first mapping of interface identifiers to the plurality of ports with a first subset of bits of the destination address, address the respective memory containing the second mapping of region identifiers of the semiconductor die to the plurality of ports with a second subset of bits of the destination address and address the respective memory containing the third mapping of the chip identifiers to the port identifiers with a third subset of bits of the destination address.

* * * * *